United States Patent [19]

Konno

[11] Patent Number: 5,072,118

[45] Date of Patent: Dec. 10, 1991

[54] RADIOGRAPHIC SYSTEM

[75] Inventor: Masaaki Konno, Kanagawa, Japan

[73] Assignee: Fuji Photo Film Co., Ltd., Kanagawa, Japan

[21] Appl. No.: 599,922

[22] Filed: Oct. 19, 1990

[30] Foreign Application Priority Data

Oct. 20, 1989 [JP] Japan .................................. 1-274364

[51] Int. Cl.$^5$ ............................................ G03B 42/02
[52] U.S. Cl. ................................................. 250/327.2
[58] Field of Search .................. 250/327.2 J, 327.2 K, 250/327.2 B, 327.2 D

[56] References Cited

U.S. PATENT DOCUMENTS

| | | | |
|---|---|---|---|
| 4,239,968 | 12/1980 | Kotera et al. | 250/327.2 |
| 4,640,507 | 2/1987 | Ohgoda et al. | 271/245 |
| 4,820,922 | 4/1989 | Nakajima | 250/327.2 |
| 4,849,631 | 7/1989 | Ono | 250/327.2 |
| 4,851,679 | 7/1989 | Tamaura et al. | 250/327.2 |
| 4,857,732 | 8/1989 | Shimura et al. | 250/327.2 |
| 4,859,849 | 8/1989 | Shimura et al. | 250/327.2 |

FOREIGN PATENT DOCUMENTS

| | | |
|---|---|---|
| 0178661 | 4/1986 | European Pat. Off. ......... 250/327.2 |
| 55-12143 | 7/1978 | Japan . |
| 56-2385 | 6/1979 | Japan . |
| 56-2386 | 6/1979 | Japan . |

Primary Examiner—Constantine Hannaher
Assistant Examiner—Edward J. Glick
Attorney, Agent, or Firm—Sughrue, Mion, Zinn, Macpeak & Seas

[57] ABSTRACT

A radiographic system includes an image exposure device for exposing a stimulable phosphor sheet to a beam of radiation transmitted from a radiation source through an object, thereby storing a radiation image of the object in the stimulable phosphor sheet, an image reading device for reading the radiation image information stored in the stimulable phosphor sheet, and a feed system interconnecting the image exposure device and the image reading device, for feeding the stimulable phosphor sheet from the image exposure device to the image reading device. A single radiation shield plate is disposed behind the image exposure device for blocking a beam of radiation transmitted through the image exposure device. A plurality of radiation shield plates are disposed in substantially surrounding relation to the feed system, for blocking a stray beam of radiation transmitted through a region outside of the image exposure device.

8 Claims, 3 Drawing Sheets

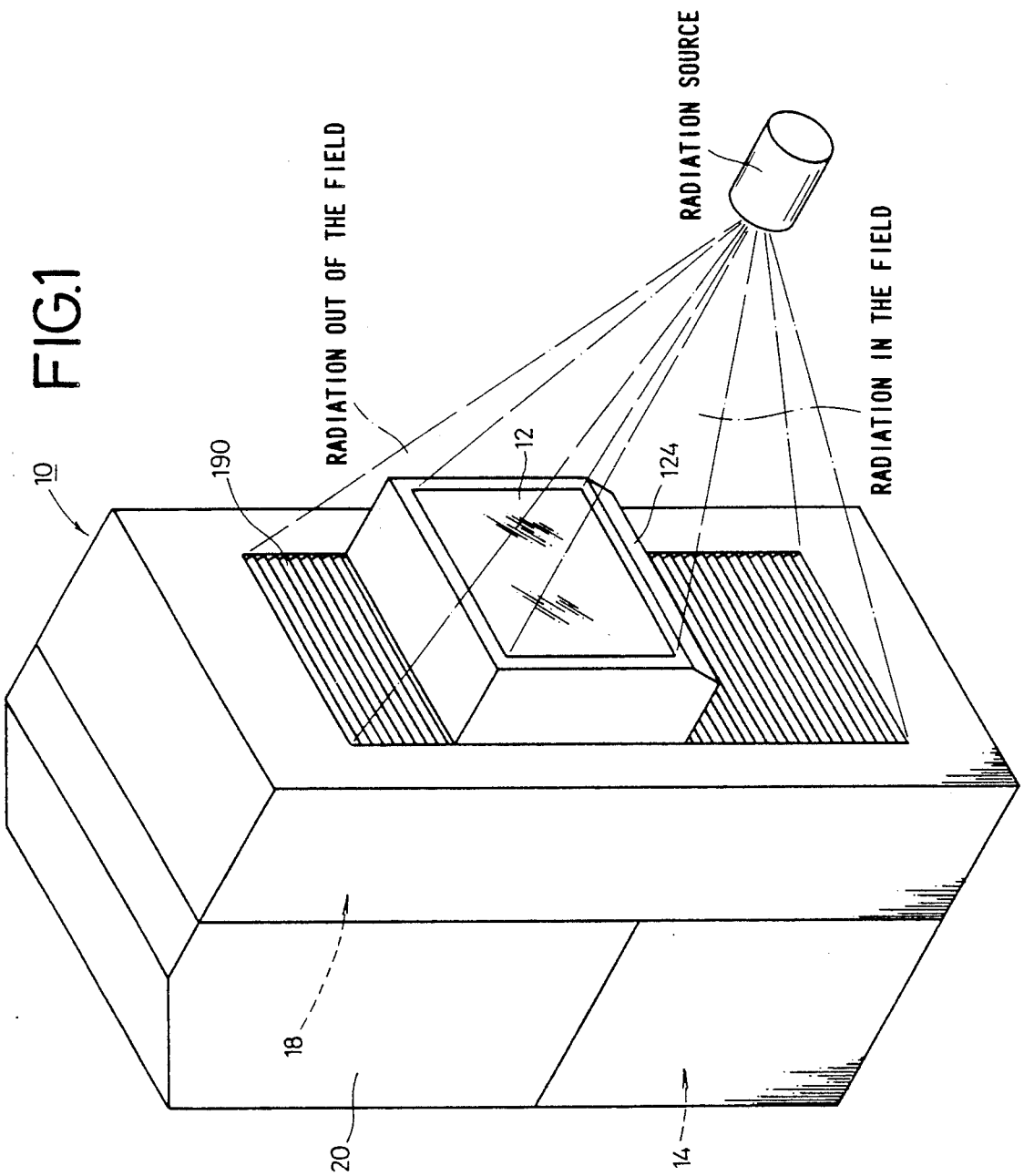

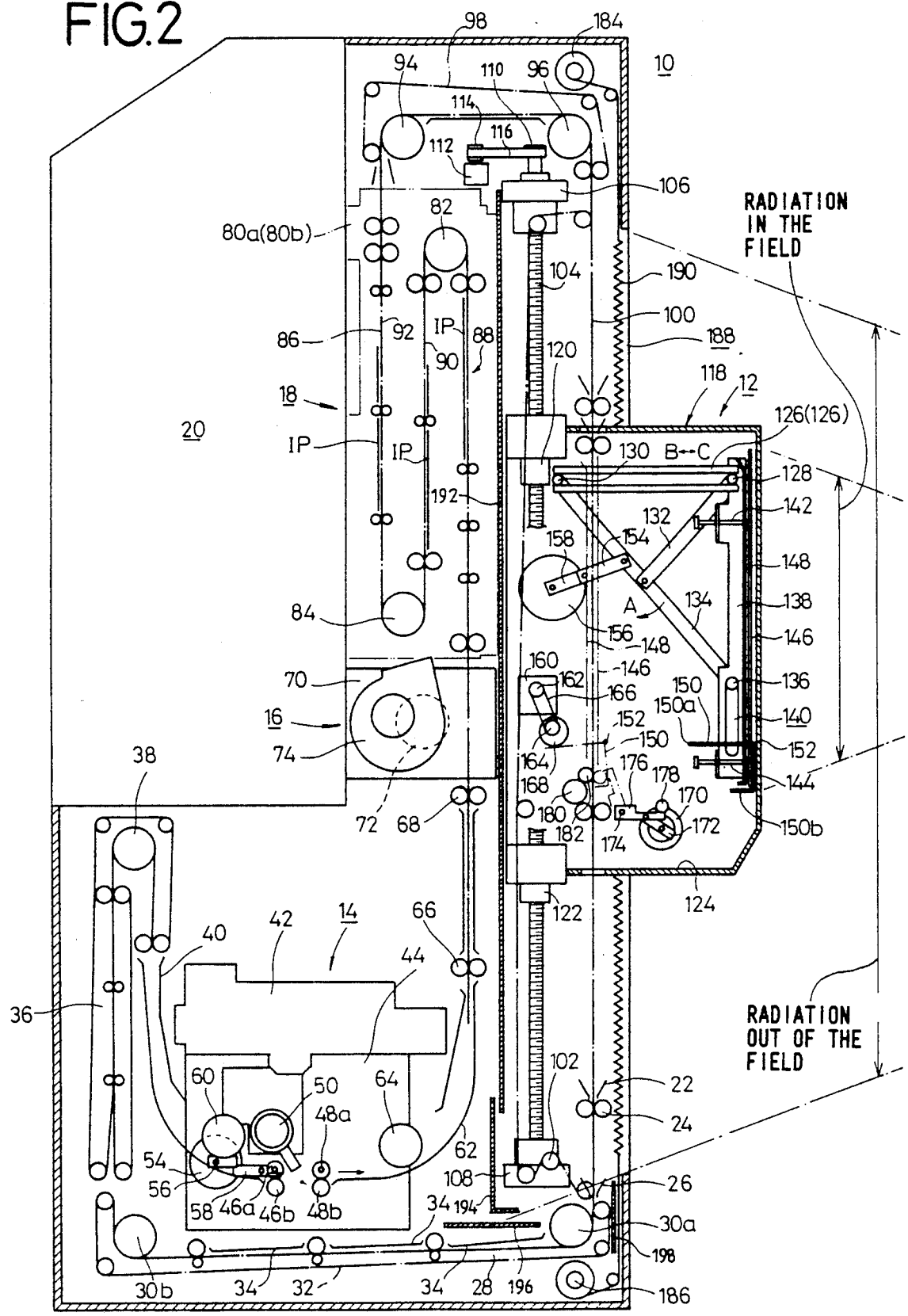

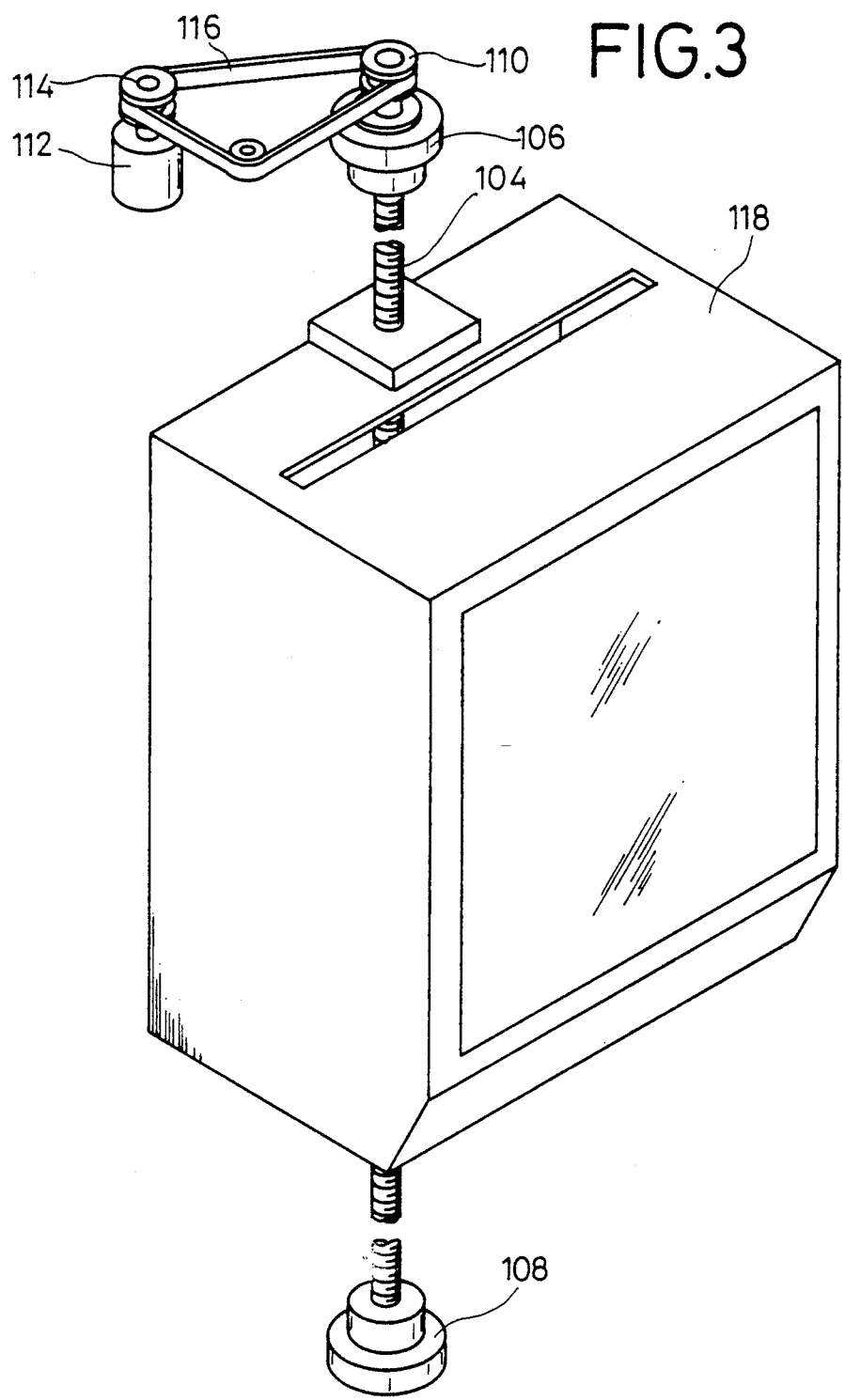

RADIOGRAPHIC SYSTEM

BACKGROUND OF THE INVENTION

1. Field of the Invention

The present invention relates to a radiographic system for recording a radiation image on an image recording medium such as a stimulable phosphor sheet, and more particularly to an upright radiographic system for repetitiously recording radiation images on image recording mediums such as stimulable phosphor sheets while they are being circulated through an exposure unit, an image reading unit, and a remaining image erasing unit by a feed system, the radiographic system having means for preventing the stimulable phosphor sheets, which may be present in the image reading unit, the remaining image erasing unit, a pre-exposure stand-by unit, or a feed path, from being exposed to unwanted stray radiation or fog.

2. Prior Art

There has been proposed an upright radiation image recording and reading system for repetitiously recording radiation images on a stimulable phosphor sheet while it is being circulated through an exposure device, an image reading device, and a remaining image erasing device by a feed system (see Japanese Laid-Open Patent Publication No. 60(1985)-176032, for example).

The upright radiation image recording and reading system records radiation images of objects in a substantially vertical condition. The stimulable phosphor sheet is a sheet having a layer of stimulable phosphor. The stimulable phosphor is a phosphorous material which, when exposed to radiation such as X-rays, $\alpha$-rays, $\beta$-rays, $\gamma$-rays, cathode rays, or ultraviolet rays, stores a part of the energy of the radiation. When the phosphor exposed to the radiation is subsequently exposed to stimulating rays such as visible light, the phosphor emits light in proportion to the stored energy of the radiation.

The radiation image recording and reading system employing such a stimulable phosphor includes an image recording device for recording the radiation image information of an object such as a human body in the stimulable phosphor sheet, an image reading device for scanning the stimulable phosphor sheet with stimulating rays such as a laser beam to cause the stimulable phosphor sheet to emit light representative of the radiation image, and for photoelectrically detecting the emitted light to produce an image signal, and a remaining image erasing unit for erasing remaining radiation energy from the stimulable phosphor sheet from which the image has been read. The stimulable phosphor sheet is circulated through the image recording device, the image reading device, and the remaining image erasing device for repetitious use. Based on the image signal produced by the image reading device, the radiation image information is reproduced as a visible image on a recording medium such as a photographic photosensitive film, or on a CRT.

The stimulable phosphor should preferably be a rare-earth-activated alkaline earth fluorohalide phosphor, whose composition is disclosed in Japanese Laid-Open Patent Publication Nos. 55(1980)-12143 and 55(1980)-12145, or a barium fluorohalide phosphor. A barium fluorohalide phosphor with a metal fluoride added is disclosed in Japanese Laid-Open Patent Publication Nos. 56(1981)-2385 and 56(1981)-2386.

Some upright radiographic systems has a displaceable exposure device. The exposure device is associated with a radiation source behind which there is disposed an image reading device, a remaining image erasing device, or a pre-exposure stand-by device. When radiation is emitted from the radiation source toward the exposure device, the emitted radiation includes a beam of radiation directed toward only the exposure device (i.e., radiation in the exposure range) and a stray beam of radiation spreading outwardly from the above beam of radiation (i.e., radiation out of the exposure range). The stray beam of radiation tends to be applied to the stimulable phosphor which may be present in the image reading device, the remaining image erasing device, the pre-exposure stand-by device, or a feed path, resulting in fog on the stimulable phosphor sheet. With such fog on the stimulable phosphor sheet, it is not possible to record a clear image on the stimulable phosphor sheet in the exposure device.

For the prevention of fog, it has been customary to use a lead plate in combination with the exposure device. However, the use of such a lead plate has proven unsatisfactory from the standpoint of sufficient solution of the fog problem. Since the exposure device is displaceable as described above, the exposure device itself has to be strong enough to support the lead plate. Accordingly, the combined weight of the exposure device and the lead plate is very large, making it difficult to service the exposure device with ease.

SUMMARY OF THE INVENTION

It is a general object of the present invention to provide a radiographic system which is of a simple arrangement for preventing a radiation image recording medium from being subjected to fog.

It is a primary object of the present invention to provide a radiographic system which has radiation shield plates covering an image reading device, a pre-exposure stand-by device, and a feed system interconnecting them in order to protect a stimulable phosphor sheet against exposure to a beam of radiation in the exposure range and a stray beam of radiation out of the exposure range, so that an exposure device is simple in structure and light in weight and can be serviced with ease.

Another object of the present invention is to provide a radiographic system for recording a radiation image in a stimulable phosphor sheet, comprising an image exposure device for exposing a stimulable phosphor sheet to a beam of radiation transmitted from a radiation source through an object, thereby storing a radiation image of the object in the stimulable phosphor sheet, the image exposure device being movable with respect to the object, an image reading device for reading the radiation image information stored in the stimulable phosphor sheet, a feed system interconnecting the image exposure device and the image reading device, for feeding the stimulable phosphor sheet from the image exposure device to the image reading device, a single radiation shield plate disposed behind the image exposure device for blocking a beam of radiation transmitted through the image exposure device, and at least one radiation shield plate disposed in substantially surrounding relation to the feed system, for blocking a stray beam of radiation transmitted through a region outside of the image exposure device.

The image exposure device is movable in a range with respect to the object, the single radiation shield plate extending parallel to the range and having substantially the same length as that of the range.

A plurality of radiation shield plates are disposed in substantially surrounding relation to the feed system, the plurality of radiation shield plates being jointly in the form of a labyrinth.

The plurality of radiation shield plates include a first shield plate, a second shield plate, and a third shield plate, the feed system comprising means for feeding the stimulable phosphor sheet with the radiation image recorded therein from the image exposure device between the first and second shield plates and the third shield plate.

The first shield plate has a bent portion directed toward the radiation source, the second shield plate extending parallel to the bent portion of the first shield plate, the second shield plate having a length large enough to block radiation transmitted beyond a distal end of the bent portion of the first shield plate.

The second shield plate has a length large enough to block radiation transmitted beyond a distal end of the third shield plate.

The radiographic system is of an upright configuration for recording a radiation image of an object in a substantially vertical position.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a perspective view of a radiographic system or radiation image recording and reading system according to the present invention;

FIG. 2 is an enlarged vertical cross-sectional view of the radiation image recording and reading system shown in FIG. 1; and FIG. 3 is a fragmentary perspective view of a mechanism for displacing an exposure unit in the radiation image recording and reading system shown in FIGS. 1 and 2.

DETAILED DESCRIPTION OF THE PREFERRED EMBODIMENT

FIG. 1 shows a radiographic system or radiation image recording and reading system 10 according to the present invention. The radiation image recording and reading system 10 generally comprises an image exposure device 12, an image reading device 14, a remaining image erasing device 16, a pre-exposure stand-by device 18, and an electric control device 20. The image exposure device 12, the image reading device 14, the remaining image erasing device 16, and the pre-exposure stand-by device 18 are interconnected by a feed system which feeds stimulable phosphor sheets IP in a circulating manner.

The image reading device 14, the remaining image erasing device 16, the pre-exposure stand-by device 18, and the image exposure device 12 will be described below in detail in the order named.

As shown in FIG. 2, a stimulable phosphor sheet IP in which the radiation image of an object is recorded by the image exposure device 12 first travels through a guide 22 of the feed system to a pair of feed rollers 24, and then through a guide 26 to a feed system assembly 28 which comprises rollers and a bet conveyor located in a lower portion of a housing of the radiation image recording and reading system 10. More specifically, the feed system assembly 28 comprises larger-diameter rollers 30a, 30b which are horizontally spaced from each other, a belt conveyor 32 extending between the rollers 30a, 30b, smaller-diameter guide rollers disposed between the rollers 30a, 30b and rollingly held against the belt conveyor 32, and guide plates 34 extending near the belt conveyor 32. The feed system assembly 28 has a downstream end portion which is bent around the roller 30b and followed by another feed system assembly 36 located upwardly of the feed system assembly 28. The feed system assembly 36 comprises a larger-diameter roller 38, belt conveyors, and smaller-diameter guide rollers. The feed system assembly 36 has a downstream portion bent around the roller 38 and directed toward curved guide plates 40. The image reading device 14, which includes the curved guide plates 40, will now be described.

The image reading device 14 has an optical unit 42 including an optical surface plate. The optical unit 42 is held in position stably against vibration by a pair of relatively large side plates 44. Between the side plates 44, there are supported a pair of nip rollers 46a, 46b and a pair of nip rollers 48a, 48b which are located downstream of the curved guide plates 40 and spaced from each other by a predetermined interval. A light guide 50 has a distal end directed toward the space between the pair of nip rollers 46a, 46b and the pair of nip rollers 48a, 48b. The nip roller 48b is coupled to a rotative drive source (not shown), whose rotative power is transmitted to the nip roller 46b through a metallic belt. The nip roller 46a is slowly movable into and out of rolling contact with the nip roller 46b by a solenoid 54 in combination with a biasing means (not shown).

More specifically, the solenoid 54 has a rotatable shaft to which there is connected an arm 56 that has a distal end engaging a pivoted arm 58 which is coupled to the shaft of the nip roller 46a. When the solenoid 54 is energized, the arm 56 lowers the arm 58 which then lifts the nip roller 46a out of contact with the nip roller 46b. When the solenoid 54 is de-energized, the nip roller 46a is urged into rolling contact with the nip roller 46b by the biasing means. A larger-diameter roller 60 is positioned partly between the curved guide plates 40 for smoothly supplying the stimulable phosphor sheet IP to the nip rollers 46a, 46b and 48a, 48b.

Curved guide plates 62 and a larger-diameter guide roller 64 are disposed downstream of the nip rollers 48a, 48b. The guide plates 62 have downstream ends positioned immediately downwardly or upstream of guide rollers 66, which are spaced downwardly or upstream from other guide rollers 68. The remaining image erasing device 16 is positioned just upwardly or downstream of the guide rollers 68.

The remaining image erasing device 16 comprises a casing 70 which has an opening for receiving the stimulable phosphor sheet IP that has been sent through the guide rollers 68 and an opening for delivering the stimulable phosphor sheet IP, from which a remaining image has been erased, toward the pre-exposure stand-by device 18. The casing 70 houses therein an erasing light source 72 such as a halogen lamp or the like and a multi-blade fan 74 for forcibly discharging the heat, which is generated when the erasing light source 72 is energized, out of the radiation image recording and reading system 10.

The pre-exposure stand-by device 18 has a pair of vertical side plates 80a, 80b between which there is supported a feed system assembly 86 including larger-diameter upper and lower rollers 82, 84 and other smaller-diameter guide rollers. The feed system assembly 86 comprises a first stand-by zone 88 disposed upstream or downwardly of the roller 82, a second stand-by zone 90 disposed downstream or downwardly of the roller 82 or upstream or upwardly of the roller 84, and a third stand-by zone 92 disposed downstream or upwardly of the roller 84. The third stand-by zone 92 has a downstream or upper portion positioned near a feed system assembly 98 including larger-diameter rollers 94, 96 which are horizontally spaced from each other.

The feed system assembly 98 is positioned in an upper portion of the housing of the radiation image recording and reading system 10. The feed system assembly 98 also includes a belt conveyor and smaller-diameter guide rollers, and is connected to another feed system assembly 100 which extends downwardly from the upper portion of the housing of the radiation image recording and reading system 10. The feed system assembly 100 includes a plurality of pairs of feed rollers including the feed rollers 24 described above.

The image exposure device 12 will now be described below. A ball screw 104 is rotatably supported in the housing of the system 10 and extends vertically substantially between the roller 96 of the upper feed system assembly 98 and the roller 30a of the lower feed system assembly 28. Specifically, the ball screw 104 has upper and lower ends rotatably supported by respective holders 106, 108 (see also FIG. 3). As shown in FIG. 3, the upper end of the ball screw 104 supports a pulley 110, and an endless belt 116 is trained around the pulley 110, a pulley 114 mounted on the rotatable shaft of a rotative drive source 112, and an idler roller. When the rotative drive source 112 is energized to rotate its rotatable shaft, the ball screw 104 is rotated about its vertical axis through the pulley 114, the belt 116, and the pulley 110.

The image exposure device 12 includes an exposure unit 118 which is movably supported on the ball screw 104. The exposure unit 118 has upper and lower internally threaded members 120, 122 which are threaded over the ball screw 104, and a casing 124 that is fixed to the internally threaded members 120, 122. The casing 124 projects outwardly from the housing of the radiation image recording and reading system 10, for use in exposing a stimulable phosphor sheet IP in the exposure unit 118 to the radiation which has passed through an object such as the body of a human being. The casing 124 houses a grid (not shown) for producing a better radiation image. Since the grid is well known in the art, it will not be described in detail.

A pair of horizontally spaced rails 126 is disposed in an upper portion of the casing 124 of the exposure unit 118. Pins 128, 130 are horizontally movably disposed in grooves defined in the respective rails 126. The pin 128 is connected to an upper end of a shorter arm 132 which is pivotally coupled at the lower end to an intermediate portion of a longer arm 134 whose upper end is connected to the pin 130. The lower end of the longer arm 134 supports a pin 136 which is movably received in a slot 140 defined in a lower portion of a vertical holder plate 138. The holder plate 138 is supported at its upper end by the pin 128. Therefore, the holder plate 138 is supported by the pins 128, 136. The slot 140 is inclined slightly inwardly from the vertical direction. Upper and lower pins 142, 144 are horizontally supported on the holder plate 138. Front and rear vertical plates 146, 148 are supported on the pins 142, 144 in horizontally spaced relation, with coil springs (not shown) disposed around the pins 142, 144, respectively, between the front and rear plates 146, 148. The front plate 146 is normally urged to move away from the rear plate 148 under the bias of the coil springs. However, when the holder plate 148 is pressed against the front panel of the exposure unit 118, the front plate 146 is forcibly displaced toward the rear plate 148 against the bias of the coil springs. The rails 126, the arms 132, 134, and the holder plate 138 jointly constitute a link mechanism. A shutter 150 which is of a substantially inverted C shape is mounted on a pivot shaft 152 that is swingably supported on a lower portion of the holder plate 128. The shutter 150 has a horizontal upper longer arm 150a and a horizontal lower shorter arm 150b. When the upper longer arm 150a of the shutter 150 is pushed downwardly, the shutter 150 is angularly moved about the pivot shaft 152 to displace the lower shorter arm 150b.

A shorter arm 154 is pivotally connected to the longer arm 134 near the pivoted end of the shorter arm 132. The arm 154 is rotatably connected to an arm 158 joined to the rotatable shaft of a rotative drive source 156. Below the rotative drive source 156, there is disposed another rotative drive source 160 which supports a pulley 162 on its rotatable shaft. A belt 166 is trained around the pulley 162 and a pulley 164, so that rotative power of the rotative drive source 160 can be transmitted from the pulley 162 through the belt 166 to the pulley 164. The pulley 164 is connected to an eccentric cam 168, which can therefore be rotated by the rotative drive source 160.

Another rotative drive source 170 is disposed in a lower portion of the casing 124 and has a rotatable shaft which operatively engages a link mechanism 172. The link mechanism 172 has a distal end coupled to an arm 176 which is angularly movable about a shaft 174. A pusher roller 178 is rotatably mounted on one end of the arm 176. When the rotative drive source 170 is energized, the arm 176 is angularly moved by the link mechanism 172 to press the presser roller 178 against a roller 182 which is being rotated by a drive roller 180.

The holder plate 148, the rotative drive source 156, the rotative drive source 160, the rotative drive source 170, the drive roller 180, and other components of the exposure unit 118 are vertically displaceable with the casing 124 by the ball screw 104 as it rotates about its vertical axis.

The housing of the radiation image recording and reading system 10 has an opening 188 defined in its front panel, with the exposure unit 118 of the image exposure device 12 being vertically movable in the opening 188. The opening 188 is covered with a closure member 190 which is joined to the exposure unit 118 and can be unreeled from and wound by takeup rollers 184, 186 that are disposed in the upper and lower portions of the housing of the system 10.

According to the present invention, as shown in FIG. 2, a radiation shield plate 192 of a laminated structure composed of a single lead panel and an iron panel is disposed behind the exposure unit 118 and extends vertically along the ball screw 104 over a range in which the exposure unit 118 is vertically movable, i.e., in which a beam of radiation in the field corresponding to the exposure unit 118 is applied from a radiation source, and also a beam of radiation out of the field is applied from the radiation source. Another radiation shield plate 194 of a bent shape, which is of also a laminated structure of a lead panel and an iron panel, is disposed in the vicinity of the lower end of the shield plate 192. A horizontal radiation shield plate 196 extends below the shield plate 194 near the roller 30a, and a vertical radiation shield plate 198 is disposed near the guide 26 and the roller 30a remotely from the shield plate 196. These shield plates 196, 198 are of the same laminated structure as the shield plates 192, 194. The radiation shield plate 196 extends parallel to the bent portion of the radiation shield plate 194, and is long enough to block radiation transmitted beyond a distal end of the bent portion of the radiation shield plate 194, and also to block radiation transmitted beyond an upper distal end of the radiation shield plate 198. The radiation shield pates 194, 196, 198 are disposed in this manner proximate portions of the feed system assemblies 28, 100.

The radiation image recording and reading system 10 according to the present invention is basically constructed as described above. Now, operation and advantages of the radiation image recording and reading system 10 will be described below.

Initially, it is assumed that a single stimulable phosphor sheet IP is positioned in an exposure position in a front portion of the exposure unit 118, the stimulable phosphor sheets IP being sandwiched between the front and rear plates 146, 148 and held by the lower shorter arm 150b of the shutter 150, and also that three stimulable phosphor sheets IP are located respectively in the first, second, and third stand-by zones 88, 90, 92 of the pre-exposure stand-by device 18. Depending on the height of the body of a patient (not shown) in front of the exposure unit 118, the rotative drive source 112 is energized to cause the pulley 114 and the belt 116 to rotate the pulley 110 and hence the ball screw 104. Since the ball screw 104 are threaded in the internally threaded members 120, 122, the exposure unit 118 is vertically moved or adjusted in vertical position to meet the height of the patient. At the same time, the closure member 190 is vertically moved in unison with the exposure unit 118 while the takeup rollers 184, 186 are being rotated, keeping the opening 188 closed to shield the interior of the housing of the system 10 from external light.

When the exposure unit 118 is suitably positioned with respect to the human body, radiation is applied from the radiation source to the body of the patient, and the radiation image of the patient's body is recorded in the stimulable phosphor sheet IP sandwiched between the front and rear plates 146, 148. After the radiation image has been recorded, the rotative drive source 156 is energized to turn the arm 158. The arm 158 causes the arm 154 to turn the arm 134 in the direction indicated by the arrow A, and the pin 128 is displaced in the direction indicated by the arrow B in unison with the holder plate 138, the front plate 146, and the rear plate 148. When the front and rear plates 146, 148 are moved away from the front panel of the exposure unit 118, the front plate 146 is spaced away from the rear plate 148 under the bias of the coil springs around the pins 142, 144, thus defining a space between the front and rear plates 146, 148.

The pin 128 is displaced along the grooves of the rails 126 by the arms 154, 134, 132, until the holder plate 138, the front plate 146, and the rear plate 148 reach the position indicated by the two-dot-and-dash lines while they are being held substantially vertically. At this time, the pin 136 on the arm 134 is displaced in and along the slot 140 in the holder plate 138. The shutter 150 is also displaced with the holder plate 138 until the upper longer arm 150a is positioned beneath the eccentric cam 168.

Then, the rotative drive source 170 is energized to enable the link mechanism 172 to turn the arm 176, displacing the presser roller 178 toward the roller 182. The stimulable phosphor sheet IP which is held by the lower shorter arm 150b of the shutter 150 is now gripped by the roller 182 and the presser roller 178.

The rotative drive source 160 is thereafter energized to bring the cam lobe of the eccentric cam 168 into engagement with the upper longer arm 150a of the shutter 150. The upper lower arm 150a is depressed by the eccentric cam 168, turning the shutter 150 about the shaft 152 on the holder plate 138 to displace the lower shorter arm 150b laterally out of holding engagement with the stimulable phosphor sheet IP. Then, the stimulable phosphor sheet IP is fed toward the guide 22 by the rollers 178, 182.

After the stimulable phosphor sheet IP has been fed to the guide 22, the rotative drive source 170 is energized to cause the link mechanism 172 and the arm 176 to move the roller 178 away from the roller 182. The rotative drive source 160 is also energized to release the cam lobe of the eccentric cam 168 from the upper longer arm 150a of the shutter 150, whereupon the lower shorter arm 150b is displaced back to a position to hold a stimulable phosphor sheet IP thereon.

The stimulable phosphor sheet IP from the image exposure device 12 is then fed through the feed system assemblies 28, 36 and the curved guide plates 40 into the image reading device 14. In the image reading device 14, the nip roller 46a, which has been lifted by the solenoid 54 through the arms 56, 58, is lowered upon energization of the solenoid 54, whereby the guided stimulable phosphor sheet IP is held by the nip rollers 46a, 46b and 48a, 48b. Then, the optical unit 42 is energized to apply a laser beam to the stimulable phosphor sheet IP in a main scanning direction. At the same time, the stimulable phosphor sheet IP is fed in an auxiliary scanning direction indicated by the arrow. Therefore, the stimulable phosphor sheet IP is two-dimensionally scanned by the laser beam in the image reading device 14.

Light which is emitted from the stimulable phosphor sheet IP when it is two-dimensionally scanned by the laser beam is transmitted through the light guide 50 to a photoelectric transducer (not shown), by which the light is converted into an electric signal that is subsequently stored as radiation image information in a memory (not shown). The radiation image information thus stored in the memory is read as required, and converted into a visible image recorded on a film by a recording device (not shown) or displayed on a CRT or the like.

The stimulable phosphor sheet IP from which the radiation image information has been read then travels along the guide plates 62 to the remaining image erasing device 16. In the remaining image erasing device 16, the erasing light source 72 in the casing 70 is energized to apply light to the stimulable phosphor sheet IP, which discharges remaining radiation image energy upon exposure to such stimulating light. Thereafter, the stimulable phosphor sheet IP is fed into the pre-exposure stand-by device 18, in which it is made available and ready for recording radiation image information thereon again. During this time, the multiblade fan 74 is energized to forcibly radiate the heat which is produced in the remaining image erasing device 16.

The stimulable phosphor sheet IP which has been present in the third stand-by zone 92 of the pre-exposure stand-by device 18 is transferred into the feed system assembly 86 into the feed system assembly 98. After the stimulable phosphor sheet IP is horizontally fed by the feed system assembly 98, it is fed downwardly to the exposure unit 118 by the feed system assembly 100. At the same time, the stimulable phosphor sheet IP which has been in the second stand-by zone 90 is transferred into the third stand-by zone 92, and the stimulable phosphor sheet IP which has been in the first stand-by zone 88 is transferred into the second stand-by zone 90.

The stimulable phosphor sheet IP which has reached the exposure unit 118 drops between the front and rear plates 146, 148 which are spaced from each other. Then, the rotative drive source 156 is energized to cause the arms 158, 154, 134, 132 to displace the holder plate 138, the front plate 146, and the rear plate 148 in the direction indicated by the arrow C. The pin 128 is displaced along the rails 126, and the holder plate 138, the front plate 146, and the rear plate 148 reach the front panel of the exposure unit 118 while they are held substantially vertically. At this time, the front and rear plates 146, 148 sandwich and press the stimulable phosphor sheet IP against the front panel of the exposure unit 118 against the bias of the coil springs disposed around the pins 142, 144.

A radiation image is then recorded on the stimulable phosphor sheet IP and thereafter processed in the same manner as described above.

According to the embodiment of the present invention, a beam of radiation which is emitted from the radiation source through the body of the patient to the exposure unit 118 (i.e., the radiation in the field) is prevented by the shield plate 192 behind the exposure unit 118 from entering the interior of the system 10 behind the exposure unit 118. A beam of radiation transmitted in a region outside of the exposure unit 118 (i.e., the radiation out of the field) is also prevented from entering the interior of the system 10 by the shield plates 192, 194, 196, 198. Therefore, the stimulable phosphor sheets IP which are present in the image reading device 14, the remaining image erasing device 16, the pre-exposure stand-by device 18, and the feed system assemblies interconnecting them, are shielded from exposure to stray radiation or fog. The shield plates 194, 196, 198 which are positioned below the shield plate 192 are jointly in the form of a labyrinth as viewed from the radiation source which emits the beam of radiation out of the field. For example, the feed system assembly below the guide 26 is concealed from the radiation source. Because of the shield plates 192, 194, 196, 198, the beam of radiation out of the field does not reach the image reading device 14, the remaining image erasing device 16, the pre-exposure stand-by device 18, and the feed system assemblies interconnecting them.

With the present invention, as described above, the shield plates are disposed behind the exposure unit of the radiation image recording and reading system or radiographic system. Some of the shield plates are arranged in a labyrinth while providing a sufficient feed path for stimulable phosphor sheets, so that they will not be exposed to an undesired stray beam of radiation out of the field.

The image exposure device is therefore simple in structure, light in weight, and can easily be serviced.

Although a certain preferred embodiment has been shown and described, it should be understood that many changes and modifications may be made therein without departing from the scope of the appended claims.

What is claimed is:

1. A radiographic system for recording a radiation image in a stimulable phosphor sheet, comprising:

an image exposure device for exposing a stimulable phosphor sheet to a beam of radiation transmitted from a radiation source through an object, thereby storing a radiation image of the object in the stimulable phosphor sheet, said image exposure device being movable with respect to the object, said radiation source radiating a direct radiation beam directed towards said image exposure device and a stray beam directed towards the periphery of said image exposure device;

an image reading device for reading the radiation image information stored in the stimulable phosphor sheet;

a feed system interconnecting said image exposure device and said image reading device, for feeding the stimulable phosphor sheet from said image exposure device to said image reading device;

a single radiation shield plate disposed behind said image exposure device for blocking a beam of radiation transmitted through said image exposure device; and means, in addition to said single radiation plate, for blocking said stray beam from radiating on said image reading device and a portion of said feed system to prevent said sheet from being exposed to said stray beam, said blocking means comprising at least one radiation shield plate disposed between said radiation source and said image reading device and said portion of said feed system.

2. A radiographic system according to claim 1, wherein said image exposure device is movable in a range with respect to the object, said single radiation shield plate extending parallel to said range and having substantially the same length as that of said range.

3. A radiographic system according to claim 1, wherein said at least one radiation shield plate comprises a plurality of radiation shield plates.

4. A radiographic system for recording a radiation image and a stimulable phosphor sheet, comprising:

an image exposure device for exposing a stimulable phosphor sheet to a beam of radiation transmitted from a radiation source through an object, thereby storing a radiation image of the object in the stimulable phosphor sheet, said image exposure device being movable with respect to the object;

an image reading device for reading the radiation image information stored in the stimulable phosphor sheet;

a feed system interconnecting said image exposure device and said image reading device, for feeding the stimulable phosphor sheet from said image exposure device to said image reading device;

a single radiation shield plate disposed behind said image exposure device for blocking a beam of radiation transmitted through said image exposure device; and a plurality of radiation shield plates for blocking a stray beam of radiation transmitted through a region outside of said image exposure device;

wherein said plurality of radiation shield plates include a first shield plate, a second shield plate, and a third shield plate, said feed system comprising means for feeding the stimulable phosphor sheet with the radiation image recorded therein from said image exposure device between said first and second shield plates and said third shield plate.

5. A radiographic system according to claim 4, wherein said first shield plate has a bent portion directed toward the radiation source, said second shield plate extending parallel to said bent portion of the first shield plate, said second shield plate having a length large enough to block radiation transmitted beyond a distal end of said bent portion of the first shield plate.

6. A radiographic system according to claim 4, wherein said second shield pate has a length large enough to block radiation transmitted beyond a distal end of said third shield plate.

7. A radiographic system according to any one of claims 1 through 6, wherein the radiographic system is of an upright configuration for recording a radiation image of an object in a substantially vertical position.

8. The radiographic system of claim 1, further comprising one of an erasing device and a pre-exposure stand-by device for respectively erasing said radiation image from said sheet and for storing a plurality of said sheets in preparation for exposure in said exposure device, said one erasing and pre-exposure device being disposed along said feed system between said image recording device and said image exposure device wherein said blocking means blocks said stray beam from radiating said one erasing device and pre-exposure device and said feed system interconnecting said image recording device and said one erasing device and pre-exposure device.

* * * * *